United States Patent [19]

Pasternak

[11] Patent Number: 5,102,551

[45] Date of Patent: Apr. 7, 1992

[54] MEMBRANE PROCESS FOR TREATING A MIXTURE CONTAINING DEWAXED OIL AND DEWAXING SOLVENT

[75] Inventor: Mordechai Pasternak, Spring Valley, N.Y.

[73] Assignee: Texaco Inc., White Plains, N.Y.

[21] Appl. No.: 692,890

[22] Filed: Apr. 29, 1991

[51] Int. Cl.$^5$ .............................................. B01D 69/00
[52] U.S. Cl. ...................................... 210/651; 210/654
[58] Field of Search ................ 210/634, 644, 649–654, 210/500.21, 500.22, 500.27, 500.26; 55/158; 264/321

[56] References Cited

U.S. PATENT DOCUMENTS

| | | | |
|---|---|---|---|
| 4,167,612 | 9/1979 | Tucker et al. | 264/321 |
| 4,602,922 | 7/1986 | Cabasso et al. | 55/158 |

*Primary Examiner*—Frank Sever
*Attorney, Agent, or Firm*—Robert A. Kulason; James J. O'Loughlin; Carl G. Seutter

[57] ABSTRACT

Charge containing dewaxed oil and dewaxing solvent (typically methyl ethyl ketone and toluene) is treated to separate dewaxing solvent by use of a separating elastomer membrane barrier of a polysiloxane which has been cross-linked as with toluene diisocyanate, adipoyl dichloride, a dialkoxy silane, or a diacetoxy silane.

14 Claims, No Drawings

MEMBRANE PROCESS FOR TREATING A MIXTURE CONTAINING DEWAXED OIL AND DEWAXING SOLVENT

FIELD OF THE INVENTION

This invention relates to a process for treating a charge containing dewaxing solvent and dewaxed oil. More particularly it relates to use of membrane technology to separate dewaxing solvent from dewaxed oil.

BACKGROUND OF THE INVENTION

As is well known to those skilled in the art, hydrocarbon stocks used for the preparation of lubricating oil contain undesirable components which are removed during processing to permit attainment of a product which is characterized by desired properties. Typically a charge stock is subjected inter alia to a dewaxing operation which decreases the wax content and desirably lowers the pour point and the cloud point of the lubricating oil stock.

Dewaxing may be effected by mixing a dewaxing solvent, such as methyl ethyl ketone or methyl isobutyl ketone, optionally in the presence of a hydrocarbon such as toluene or xylene, with the charge oil and cooling the mixture below the desired pour point, typically to minus 5° F.-minus 20° F., say minus 10° F., at which point wax precipitates. The wax is filtered; and the dewaxed oil-dewaxing solvent mixture is recovered.

This recovered mixture has classically been flashed to recover solvent-free lubricating oil stock and solvent which is free of lubricating oil.

Those skilled in the art have attempted to improve the economics of this process by utilizing membrane technology to separate dewaxing solvent from dewaxed oil. Illustrative of such prior art attempts may be the following:

U.S. Pat. No. 4,985,138 to Pasternak discloses a cross-linked polyimine membrane.

European Patent Specification 0 220 753 A1 to Bitter et al discloses use of a halogen-substituted silicone membrane.

U.S. Pat. No. 4,678,555 to Wernick discloses use of cellulose acetate membranes.

European Patent Specification 0 125 907 A1 to Wight discloses use of a polyimide membrane containing -CO-NO-linkages.

U.S. Pat. No. 4,617,126 to Funk et al discloses use of a polysulfone membrane.

Additional background may be obtained from the references set forth in these patents.

It is an object of this invention to provide a process for treating a charge containing dewaxing solvent and dewaxed oil. Other objects will be apparent to those skilled in the art.

STATEMENT OF THE INVENTION

In accordance with certain of the aspects, this invention is directed to a process for treating a charge containing dewaxing solvent and dewaxed oil which comprises passing said charge containing dewaxing solvent and dewaxed oil into contact with, as separating membrane, a non-porous elastomer separating polysiloxane membrane layer which has been cross-linked with, as a cross-linking agent, (i) a polyisocyanate or (ii) a poly(carbonyl chloride) or (iii) a silane $R_{4-a} Si(A)_a$ wherein A is —OH, —NH$_2$, —OR, or —OOCR, a is 2, 3, or 4, and R is hydrogen or an alkyl, aralkyl, cycloalkyl, aryl, or alkaryl group;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

DESCRIPTION OF THE INVENTION

The lube oil stocks which may be treated by dewaxing may include distillate stocks, deasphalted oils, raffinates from solvent extraction of distillate, hydrotreated oils, hydrocracked distillates, etc. typically ranging in viscosity at 100° F. from about 30 SUS to 4000 SUS. Typically such a charge may be characterized by the following:

TABLE

| Property | Range | Preferred | Typical |
| --- | --- | --- | --- |
| ibp °F. | 590–900 | 600–800 | 675 |
| 50% bp °F. | 725–1100 | 800–900 | 850 |
| 90% bp °F. | 800–1350 | 850–950 | 920 |
| Viscosity | | | |
| SUS/ | | | |
| 100° F. | 35–3500 | 40–100 | 54.63 |
| 60° F. | 50–10,000 | 100–400 | 348.7 |
| API Gravity | 20–30 | 22–29 | 25.8 |
| Sp. Gr 15° C./15° C. | 0.870–0.895 | 0.880–0.890 | 0.890 |
| Pour Point °F. | 90–125 | 95–110 | 95+ |
| Flash Point °F. | 360–600 | 385–560 | 460 |
| Refractive Index @ 70° C. | 1.4720–1.4940 | 1.4755–1.4920 | 1.4840 |

This waxy oil charge (100 volumes) is mixed with 100–1000 volumes, preferably 200–500 volumes, say 200 volumes (depending on the viscosity grade and wax content of the feedstock) of ketone dewaxing solvent—such as acetone or preferably methyl ethyl ketone or methyl isobutyl ketone preferably diluted with a hydrocarbon solvent to produce dewaxing solvent. In a preferred embodiment, there may be added to 100 volumes of waxy oil charge, dewaxing solvent containing 100–150 volumes of ketone such as methyl ethyl ketone plus 100–50 volumes of a hydrocarbon solvent such as toluene or xylene. The mixture is cooled to minus 5° F.-minus 20° F., say minus 10° F., during which cooling, solid wax precipitates from the waxy oil charge. Typically a mid-continent distillate may be cooled to minus 10° F. to obtain a 0° F. pour point 100 neutral oil. Wax is filtered in a rotary vacuum filter to yield a dewaxed oil filtrate.

In accordance with practice of the process of this invention, this filtrate, containing dewaxing solvent and dewaxed oil, is passed into contact with, as a separation membrane, a non-porous separating elastomer membrane layer.

THE MEMBRANE ASSEMBLY

Practice of the process of this invention may be carried out by use of a composite structure which in one preferred embodiment may include (i) a carrier layer which provides mechanical strength, (ii) a porous support layer, and (iii) a separating elastomer membrane layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, woven fibrous polyester. A typical polyester carrier layer may be formulated of non-woven, thermally-bonded strands.

THE POROUS SUPPORT LAYER

The porous support layer (typically an ultrafiltration membrane) which may be used in practice of this invention is preferably formed of polyacrylonitrile polymer. Typically the polyacrylonitrile may be of thickness of 40–80 microns, say 50 microns and is preferably characterized by a pore size of less than about 500A and typically about 200A. This corresponds to a molecular weight cut-off of less than about 50,000, typically about 40,000.

THE SEPARATING LAYER

The separating layer which permits attainment of separation in accordance with the process of this invention includes a non-porous elastomer film or membrane of thickness 1–5 microns, say about 1.5 microns of a polysiloxane polymer of molecular weight $\overline{M}_n$ of about 550–150,000, preferably 550–4200, more preferably say about 1,750 (prior to cross-linking), which is cross-linked with, as cross-linking agent, (i) a polyisocyanate, or (ii) a poly(carbonyl chloride) or (iii) $R_{4-a} Si(A)_a$ wherein A is —OH, —HH$_2$, —OR, or —OOCR, a is 2, 3, or 4, and R is hydrogen, alkyl, aryl, cycloalkyl, alkaryl, or aralkyl.

The polysiloxanes which may be employed, as elastomer membranes, in practice of the process of this invention may include membranes of molecular weight $\overline{M}_n$ of 550–150,000, say 1,750 of halogen-free polysiloxanes which contain the repeating unit -Si-O- and wherein the silicon atoms bear hydrogen or a hydrocarbon group. Preferably the repeating units are of the form

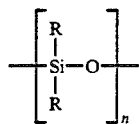

In the above formula, R may be hydrogen or a hydrocarbon group selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 2-ethoxyethyl, carboethoxymethyl, 4-methyl cyclohexyl, p-methylphenyl, p-ethylbenzyl, 3-ethyl-5-methylphenyl, etc. The preferred R groups may be lower alkyl, i.e. $C_1$-$C_{10}$ alkyl, groups including e.g. methyl, ethyl, n-propyl, i-propyl, butyls, amyls, hexyls, octyls, decyls, etc. R may preferably be methyl.

The preferred of these halogen-free polysiloxanes are the di-silanol-terminated poly(dimethyl siloxanes) of lower molecular weight, typically 550–150,000, preferably 550–4200, more preferably, say 1,750. These polysiloxane elastomer membranes, which yield good Flux and Separation, may be characterized by the formula:

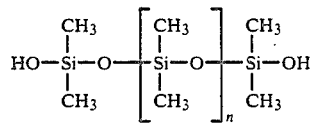

wherein n is about 7–2000, say 24.

A preferred group of polysiloxanes may be polydimethyl siloxanes which are silanol terminated. Illustration polysiloxanes which may be employed may be those set forth in the Table which follows:

TABLE

| | | | Molecular Weight |
|---|---|---|---|
| A | Silanol terminated | polydimethyl siloxane | 550 |
| B | " | " | 1750 |
| C | " | " | 4200 |
| D | " | " | 58,000 |
| E | " | " | 110,000 |
| F | " | " | 150,000 |
| G | Acetoxy terminated | " | 36,000 |
| H | Methoxy terminated | " | 27,000 |
| I | Ethoxy terminated | " | 950 |
| J | Carbinol terminated | " | 1250 |
| K | Aminopropyl dimethyl terminated | " | 2500 |

It is a feature of the process of this invention that the silicone membranes are cross-linked. In the case of the non-cyclic silicones, which bear reactive terminal groups typified by —OH or —NH$_2$, they may be cross-linked by (i) a polyisocyanate, (ii) a poly(carbonyl chloride) or (iii) a silane

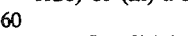

wherein A is —OH, —NH$_2$, —OR, or —OOCR, a is 2, 3, or 4, and R may be as noted supra. The R groups need not be all the same.

It will be apparent that cross-linking is effected by reaction between the reactive terminal group of the non-cyclic silicone and the A group of the silane; and accordingly these groups which are to react should be different from each other. Preferably the silicone may be amino terminated, more preferably hydroxy terminated, and in the silane, A is preferably —OR or —OOCR. When the silane contains the moiety —OR or —OOCR, and the silicone is —OH terminated for example, the cross-linked polymer includes linkages of the type.

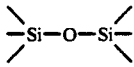

It will be apparent that the silicone may be —OR or —OOCR terminated, in which instance the silane may preferably contain an —OH moiety. It appears that no cross-linking may occur when the silicone is terminated by hydrogen.

When the silicone is a cyclic silicone, typified for example by decamethyl cyclopentasiloxane, it will be apparent that the molecule bears no terminal groups. In this instance, cross-linking is effected by breaking an Si-O bond in the ring by reaction with the cross-linking agents.

It will be apparent that when A is —OR, the compound is an alkoxy silane; and when A is —OOCR, the compound is an acyloxy silane. When A is —NH$_2$ OR —OH, the compound is an aminosilane or a hydroxy silane.

Typical alkoxy silanes which may be employed may include:

TABLE

| methyl | triethoxy | silane |
|---|---|---|
| dimethyl | diethoxy | silane |
| dimethyl | dimethoxy | silane |
| ethyl | trimethoxy | silane |
| phenyl | triethoxy | silane |
| benzyl | trimethoxy | silane |
| p-tolyl | trimethoxy | silane |
| 1,2-dimethoxy | tetramethyl | disilane |
| tetramethoxy | | silane |

Typical acyloxy silanes which may be employed may include:

TABLE

| dimethyl | diacetoxy | silane |
|---|---|---|
| methyl | triacetoxy | silane |
| diethyl | diacetoxy | silane |
| dipheny | diacetoxy | silane |
| benzyl | tri acetoxy | silane |
| p-tolyl | tri acetoxy | silane |
| | tetra acetoxy | silane |
| 1,2-di-acetoxy | tetramethyl | disilane |
| 1,2-dimethyl | tetra acetoxy | disilane |

Mixed alkoxy, acyloxy silanes may be employed typified by:

TABLE

| dimethoxy | diacetoxy | silane |
|---|---|---|
| methoxy | triacetoxy | silane |

Illustrative aminosilanes may include dimethyl diamino silane or dibutyl diaminosilane; illustrative hydroxy silanes may include diethyl dihydroxy silane or methyl trihydroxy silane.

Typical polyisocyanates may include, the first listed being preferred:

TABLE

| toluene | diisocyanate |
|---|---|
| phenylene | diisocyanate |
| hexamethylene | diisocyanate |
| toluene | tri-isocyanate |

Typical poly(carbonyl chlorides) may include, the first listed being preferred:

TABLE

| adipoyl | dichloride |
|---|---|
| isophthaloyl | dichloride |
| suberoyl | dichloride |

Formation of the cross-linked elastomer silicone membrane may be carried out in a solution, in insert diluent-solvent (typified by a hydrocarbon such as commercial hexane) of 5-15, say 10 w % of the non-halogenated polysiloxane plus 1-10 w %, say 4 w % of cross-linking agent.

This solution may be solvent cast as a 0.5-4 mil, say 2 mil film onto a support layer (on a carrier layer) typically at say 25° C. Thereafter it is cured at 110° C.-140° C., say 125° C. for 10-20 minutes, say 15 minutes to form a film 1-5, say 1.5 microns thick.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 10-80 microns, and of molecular weight cut-off of 25,000-100,000, and (iii) as a non-porous separating layer a polysiloxane elastomer membrane which has been cross-linked with, as cross-linking agent, a polyisocyanate, or a poly(carbonyl chloride) or $R_{4-a}$ Si $(A)_a$ wherein A is —OH, —NH$_2$ —OR, or —OOCR, a is 2, 3, or 4, and R is alkyl, aryl, cycloalkyl, alkaryl, or aralkyl.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therethrough to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polyacrylonitrile porous support layer may be extruded as a fine tube with a wall thickness of typically 0.001-0.1 mm. The extruded tubes are passed through a bath of silicone which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous cross-linked elastomer separating layer that it is found to be particularly effective when used in a pressure driven process. In a pressure driven process, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge containing dewaxing solvent and dewaxed oil in liquid phase typically at 20° C.-40° C., say 25° C. may be passed into contact with the non-porous elastomer separating layer of the membrane of this invention. A pressure drop of about 500-1000 psi, say 800 psi is commonly maintained across the membrane. The feed or charge side of the membrane is at pressure sufficient to drive permeate across the membrane and commonly about 800 psig; and the permeate or discharge side of the membrane is at about atmospheric pressure. The feed is passed over the surface (ca three inches in diameter in one embodiment) of the membrane at a rate (e.g. of about 1200 ml/min) which minimizes the possibility of concentration polarization.

The permeate which passes through the membrane includes increased content of dewaxing solvent and decreased content of dewaxed oil; and the retentate includes increased content of dewaxed oil and decreased content of dewaxing solvent.

Typically when the charge to the membrane contains(per 100 parts of oil) 100-1100, preferably 200-600 parts, say 200 parts of dewaxing solvent, the permeate may be found to typically contain about 96 w % of dewaxing solvent.

Permeate is recovered in liquid phase.

Separation may typically be carried out at a flux of 20-40, say 37.1 kilograms per square meter per hour (kmh). Typically the membranes may have a rejection of more than 80% and commonly 70%-90%, say 89.7%.

$$\text{Rejection \%} = \frac{\text{(Feed Concentration} - \text{Permeate Concentration)}}{\text{Feed Concentration}} \times 100.$$

Practice of the process of this invention will be apparent to those skilled in the art from the following examples wherein, as elsewhere in this specification, all percentages are percentages by weight unless otherwise stated.

DESCRIPTION OF SPECIFIC EMBODIMENTS

EXAMPLE I

In this Example, which represents the best mode of carrying out the process of this invention, the elastomer separating membrane is formed on the DUY-L brand (of Daicel Corp.) composite which includes as carrier layer the woven polyester backing described supra. The porous support layer is the commercially available polyacrylonitrile (PAN) having a 40,000 molecular weight cut off.

The solution of elastomer in commercial hexane containing (i) 9 w % disilanol-terminated poly dimethyl siloxane (m.w. 1750) and (ii) 4 w % 2,4-toluene diisocyanate is poured onto the porous support layer at 25° C. to coat a film of about 2 mil thickness, followed by heat curing at 125° C. for 15 minutes.

This membrane (three inch diameter circle) is mounted in a standard cell. There is admitted to the cell and to the non-porous elastomer separating layer a charge containing one part by weight of dewaxed SNO-100 oil and 1 part by weight of methyl ethyl ketone and 1 part by weight of toluene.

Separation is carried out at room temperature of 25° C. and a charge (and retentate) pressure of about 800 psig. Feed is at 25° C./800 psig at flow rate of 1200 ml/min. Permeate pressure is atmospheric. Selectivity is measured and reported as % Rejection which is calculated at 100×(the quantity of dewaxed oil in the feed minus the quantity of dewaxed oil in the permeate) divided by the quantity of dewaxed oil in the feed. Clearly a higher Selectivity is desired, as this means that the retentate desirably contains less dewaxing solvent and the permeate desirably contains more solvent. Flux is measured as kilograms per square meter per hour (kmh).

In this Example, the Selectivity is 89.7% rejection and the Flux is 37.1.

EXAMPLES II-V

In this series of Examples, the procedure of Example I is followed except that in Example II, the toluene diisocyanate is present in amount of 2%, in Examples III-IV the cross-linking agent is adipoyl dichloride (2 w % and 4 w % respectively) and in Example V, no cross-linking agent is employed.

TABLE

| Example | Selectivity % Rejection | Flux (kmh) |
|---------|-------------------------|------------|
| I       | 89.7                    | 37.1       |
| II      | 87.4                    | 36.8       |
| III     | 84.2                    | 39.1       |
| IV      | 83.5                    | 37.2       |
| V*      | 68.2                    | 29.6       |

*Control Example

EXAMPLES VI-IX

In this series of Examples, the procedure of Example I is followed except that the polysiloxane is decamethyl cyclopentasiloxane

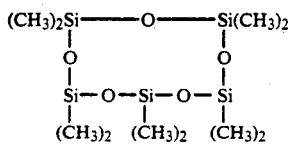

present as 5 w % solution in commercial hexane which also contains 5 w % of a multifunctional cross-linking agent as noted in the Table which follows:

TABLE

| Example | Cross-Linking Agent | Selectivity (% Rejection) | Flux (kmh) |
|---------|---------------------|---------------------------|------------|
| VI      | dimethyl diethoxy silane | 77.4 | 29.7 |
| VII     | methyl triethoxy silane | 77.4 | 33.4 |
| VIII    | dimethyl diacetoxy silane | 82.5 | 34.0 |
| IX*     | no cross-linking agent | 77.4 | 30.6 |

From inspection of Examples I-IX*, it will be apparent that the technique of this invention permits attainment of results (in terms of Selectivity and Flux) which are consistently higher than those attained when no cross-linking agent is employed. Best results appear to be attained in Example I using a linear disilanol terminated poly dimethyl siloxane which has been cross-linked with toluene diisocyanate.

EXAMPLES X*-XV*

In this series of Examples, a series of silanol-terminated polydimethyl siloxanes of different molecular weight (in 10 w % hexane solution) were formed into similar elastomer membranes which were not chemically cross-linked.

TABLE

| Example | Molecular Weight | Selectivity (% Rejection) | Flux (kmh) |
|---------|------------------|---------------------------|------------|
| X*      | 150,000          | 47.7                      | 23.3       |
| XI*     | 110,000          | 48.5                      | 26.3       |
| XII*    | 58,000           | 53.8                      | 24.1       |
| XIII*   | 4,200            | 65.1                      | 28.4       |
| XIV*    | 1,750            | 68.2                      | 29.6       |
| XV*     | 550              | 70.6                      | 31.4       |

From inspection of Example X*-XV*, it is clear that uncross-linked silicone polymers yield results which are generally much less satisfactory.

Although this invention has been illustrated by reference to specific embodiments, it will be apparent to those skilled in the art that various charges and modifications may be made which clearly fall within the scope of the invention.

What is claimed:

1. The process for treating a charge containing dewaxing solvent and dewaxed oil which comprises
   passing said charge containing dewaxing solvent and dewaxed oil into contact with, as separating membrane, a non-porous elastomer separating polysiloxane membrane layer which has been cross-linked with, as cross-linking agent, (i) a polyisocyanate or (ii) a poly(carbonyl chloride) or (iii) a silane $R_{4-a} Si (A)_a$ wherein A is —OH, —NH$_2$, —OR, or —OOCR, a is 2, 3, or 4, and R is hydrogen or an alkyl, aralkyl, cycloalkyl, aryl, or alkaryl group;
   maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;
   maintaining the pressure on the low pressure discharge side of said membrane above the vapor pressure of said permeate thereby maintaining said permeate in liquid phase;
   maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;
   recovering said permeate containing increased content of dewaxing solvent and decreased content of dewaxed oil; and
   recovering said retentate containing increased content of dewaxed oil and decreased content of dewaxing solvent.

2. The process for treating a charge containing dewaxing solvent and dewaxed oil as claimed in claim 1 wherein said polysiloxane, prior to cross-linking, has a molecular weight $\overline{M}_n$ of about 550–4200.

3. The process for treating a charge containing dewaxing solvent and dewaxed oil as claimed in claim 1 wherein said polysiloxane is a cyclic polysiloxane.

4. The process for treating a charge containing dewaxing solvent and dewaxed oil as claimed in claim 1 wherein said polysiloxane is a linear polysiloxane.

5. The process for treating a charge containing dewaxing solvent and dewaxed oil as claimed in claim 1 wherein said polysiloxane is a silanol-terminated linear polysiloxane.

6. The process for treating a charge containing dewaxing solvent and dewaxed oil as claimed in claim 1 wherein said polysiloxane is a silanol-terminated linear dimethyl siloxane of molecular weight $\overline{M}_n$ of 550–4200.

7. The process for treating a charge containing dewaxing solvent and dewaxed oil as claimed in claim 1 wherein said cross-linking agent is a polyisocyanate.

8. The process for treating a charge containing dewaxing solvent and dewaxed oil as claimed in claim 1 wherein said cross-linking agent is a toluene diisocyanate.

9. The process for treating a charge containing dewaxing solvent and dewaxed oil as claimed in claim 1 wherein said cross-linking agent is a poly(carbonyl chloride).

10. The process for treating a charge containing dewaxing solvent and dewaxed oil as claimed in claim 1 wherein said cross-linking agent is adipoyl dichloride.

11. The process for treating a charge containing dewaxing solvent and dewaxed oil as claimed in claim 1 wherein said cross-linking agent is $R_{4-a} Si(A)_a$ wherein A is —OR or —OOCR, a is 2, 3, or 4, and R is hydrogen or an alkyl, aralkyl, cycloalkyl, aryl, or alkaryl group.

12. The process for treating a charge containing dewaxing solvent and dewaxed oil as claimed in claim 1 wherein said cross-linking agent is dimethyl diacetoxy silane.

13. The process for treating a charge containing dewaxing solvent and dewaxed oil as claimed in claim 1 wherein said cross-linking agent is methyl triethoxy silane.

14. The process for treating a charge containing dewaxing solvent and dewaxed oil which comprises
    passing said charge containing dewaxing solvent and dewaxed oil into contact with, as separating membrane, a non-porous elastomer separating polysiloxane layer which has been cross-linked with a toluene diisocyanate cross-linking agent;
    maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;
    maintaining the pressure on the low pressure discharge side of said membrane above the vapor pressure of said permeate thereby maintaining said permeate in liquid phase;
    maintaining the pressure on the high pressure retentate side of said membrane above the vapor pressure of said charge containing dewaxing solvent and dewaxed oil and sufficient to drive permeate across said membrane by thereby maintaining said charge dewaxing solvent and dewaxed oil and said retentate in liquid phase;
    recovering said permeate containing increased content of dewaxing solvent and decreased content of dewaxed oil; and
    recovering said retentate containing increased content of dewaxed oil and decreased content of dewaxing solvent.

* * * * *